United States Patent
Tsuda

(10) Patent No.: US 10,685,788 B2
(45) Date of Patent: *Jun. 16, 2020

(54) ELECTROLYTIC CAPACITOR

(71) Applicant: Panasonic Intellectual Property Management Co., Ltd., Osaka (JP)

(72) Inventor: Yasuhiro Tsuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/287,618

(22) Filed: Feb. 27, 2019

(65) Prior Publication Data
US 2019/0259541 A1    Aug. 22, 2019

Related U.S. Application Data

(63) Continuation of application No. 15/725,344, filed on Oct. 5, 2017, now Pat. No. 10,262,806, which is a (Continued)

(30) Foreign Application Priority Data

Apr. 28, 2015 (JP) .................................. 2015-091447

(51) Int. Cl.
*H01G 9/055* (2006.01)
*H01G 9/04* (2006.01)
(Continued)

(52) U.S. Cl.
CPC ............ *H01G 9/028* (2013.01); *H01G 9/0036* (2013.01); *H01G 9/022* (2013.01); *H01G 9/035* (2013.01);
(Continued)

(58) Field of Classification Search
CPC ........ H01G 9/028; H01G 9/022; H01G 9/035; H01G 9/04; H01G 9/055; H01G 9/07; H01G 9/15; H01G 11/48; H01G 11/56
See application file for complete search history.

(56) References Cited

U.S. PATENT DOCUMENTS

| 4,734,821 A | 3/1988 | Morimoto et al. |
| 10,262,806 B2 * | 4/2019 | Tsuda ................ H01G 9/028 |

(Continued)

FOREIGN PATENT DOCUMENTS

| JP | H10-270291 A | 10/1998 |
| JP | 2006-100478 | 4/2006 |

(Continued)

OTHER PUBLICATIONS

International Search Report of PCT application No. PCT/JP2016/001333 dated May 24, 2016.

(Continued)

*Primary Examiner* — Dion Ferguson
(74) *Attorney, Agent, or Firm* — McDermott Will & Emery LLP

(57) ABSTRACT

An electrolytic capacitor includes a capacitor element and an electrolyte solution. The capacitor element includes: an anode foil on which a dielectric layer is formed; a cathode foil on which an inorganic conductive layer is formed; and a conductive polymer layer disposed between the anode foil and the cathode foil. The inorganic layer has a surface having projections and recesses.

15 Claims, 2 Drawing Sheets

Related U.S. Application Data continuation of application No. PCT/JP2016/001333, filed on Mar. 10, 2016.

(51) Int. Cl.

| | | |
|---|---|---|
| *H01G 9/028* | (2006.01) | |
| *H01G 9/035* | (2006.01) | |
| *H01G 9/00* | (2006.01) | |
| *H01G 9/042* | (2006.01) | |
| *H01G 9/145* | (2006.01) | |
| *H01G 9/022* | (2006.01) | |
| *H01G 9/07* | (2006.01) | |
| *H01G 9/15* | (2006.01) | |
| *H01G 11/48* | (2013.01) | |
| *H01G 11/56* | (2013.01) | |

(52) U.S. Cl.
CPC ............. *H01G 9/04* (2013.01); *H01G 9/0425* (2013.01); *H01G 9/055* (2013.01); *H01G 9/07* (2013.01); *H01G 9/145* (2013.01); *H01G 9/15* (2013.01); *H01G 11/48* (2013.01); *H01G 11/56* (2013.01)

(56) References Cited

U.S. PATENT DOCUMENTS

| | | | |
|---|---|---|---|
| 10,325,731 B2* | 6/2019 | Tsuda | .................... H01G 9/028 |
| 2005/0195557 A1 | 9/2005 | Hayashi et al. | |
| 2006/0098384 A1 | 5/2006 | Takeda et al. | |
| 2008/0002334 A1 | 1/2008 | Kakuma et al. | |
| 2008/0218945 A1 | 9/2008 | Ro et al. | |
| 2013/0330617 A1 | 12/2013 | Yoshimura et al. | |
| 2014/0036416 A1 | 2/2014 | Ishimoto et al. | |
| 2015/0213962 A1 | 7/2015 | Koseki et al. | |
| 2016/0148756 A1 | 5/2016 | Wada et al. | |
| 2018/0047511 A1 | 2/2018 | Tsuda | |
| 2019/0259547 A1* | 8/2019 | Tsuda | .................... H01G 9/028 |

FOREIGN PATENT DOCUMENTS

| | | |
|---|---|---|
| JP | 2006-190878 A | 7/2006 |
| JP | 2008-010657 A | 1/2008 |
| JP | 2012-174865 A | 9/2012 |
| WO | 2014/021333 A1 | 2/2014 |
| WO | 2014/208607 | 12/2014 |

OTHER PUBLICATIONS

Non-final Office Action issued in U.S. Appl. No. 15/725,344, dated Aug. 6, 2018.
Notice of Allowance issued in U.S. Appl. No. 15/725,344, dated Dec. 5, 2018.
International Search Report of PCT application No. PCT/JP2016/001335 dated May 24, 2016.
Non-Final Office Action issued in U.S. Appl. No. 15/812,407, dated Oct. 4, 2018.
Notice of Allowance issued in U.S. Appl. No. 15/812,407, dated Feb. 7, 2019.
Non-final Office Action issued in U.S. Appl. No. 16/404,265, dated Oct. 4, 2019.
Notice of Allowance issued in U.S. Appl. No. 16/404,265, dated Jan. 21, 2020.

\* cited by examiner

ELECTROLYTIC CAPACITOR

RELATED APPLICATIONS

This application is a continuation of U.S. patent application Ser. No. 15/725,344, filed Oct. 5, 2017, which is a continuation of the International Application No. PCT/JP2016/001333, filed on Mar. 10, 2016, which in turn claims the benefit of Japanese Application No. 2015-091447, filed Apr. 28, 2015, the disclosures of which are incorporated by reference herein.

TECHNICAL FIELD

The present disclosure relates to an electrolytic capacitor including a conductive polymer layer (solid electrolyte layer) and an electrolyte solution.

BACKGROUND

As small-sized, large capacitance, and low ESR (Equivalent Series Resistance) capacitors, promising candidates are electrolytic capacitors including an anode body on which a dielectric layer is formed and a conductive polymer layer formed so as to cover at least a part of the dielectric layer.

In Unexamined Japanese Patent Publication No. 2012-174865, it is proposed, in a solid electrolytic capacitor that includes a capacitor element having a conductive polymer layer in the capacitor element, that, for example, a carbon layer be formed on a cathode foil of the capacitor element to suppress generation of an electrostatic capacity in a cathode. In Unexamined Japanese Patent Publication No. 2012-174865, the conductive polymer layer is formed through heat polymerization by immersing a wound body in a polymerization liquid containing a raw material of a conductive polymer, the wound body being obtained by winding an anode foil and the cathode with a separator interposed between the anode foil and the cathode.

In Unexamined Japanese Patent Publication No. 2008-010657, an electrolytic capacitor obtained by impregnating with an electrolyte solution a capacitor element is proposed. The electrolytic capacitor includes an anode foil on which a dielectric layer is formed, a cathode foil, a separator interposed between the anode foil and the cathode foil, and a conductive polymer layer formed on surfaces of the dielectric layer, the separator, and the cathode foil. In Unexamined Japanese Patent Publication No. 2008-010657, the conductive polymer layer is formed by impregnating the anode foil, the cathode foil, and the separator with a dispersion in which particles of a conductive polymer are dispersed.

SUMMARY

One aspect of an electrolytic capacitor according to the present disclosure includes: a capacitor element; and an electrolyte solution. The capacitor element includes: an anode foil on which a dielectric layer is formed; a cathode foil on which an inorganic conductive layer is formed; and a conductive polymer layer including a conductive polymer. The cathode foil is opposite to the anode foil. The conductive polymer layer is disposed between the anode foil and the cathode foil. The inorganic layer has a surface having projections and recesses. The conductive polymer layer is a layer formed with use of a dispersion or a solution containing the conductive polymer. The projections form a region where the inorganic layer is in contact with the conductive polymer layer. The recesses form a region where the inorganic layer is not in contact with the conductive polymer layer.

According to the present disclosure, it is possible to reduce the ESR even with use of an electrolyte solution and secure a high capacitance, in an electrolytic capacitor including a conductive polymer layer formed with use of a dispersion or a solution containing a conductive polymer.

DESCRIPTION OF EMBODIMENTS

Prior to describing exemplary embodiments of the present disclosure, problems in a conventional electrolytic capacitor are described.

In the solid electrolytic capacitor as in Unexamined Japanese Patent Publication No. 2012-174865, a high capacitance is expected by forming an inorganic conductive layer such as a carbon layer. In addition, ESR is expected to be reduced by improving conductivity of the cathode. On the other hand, a property of restoring the dielectric layer is increased with use of the electrolyte solution in Unexamined Japanese Patent Publication No. 2008-010657.

In a case of using a polymerization liquid containing a raw material of a conductive polymer as in Unexamined Japanese Patent Publication No. 2012-174865, however, even use of the electrolyte solution is unlikely to increase the property of restoring the dielectric layer. In addition, in a case of using a dispersion or a solution containing a conductive polymer together with an electrolyte solution, formation of an inorganic conductive layer on a cathode side as in Unexamined Japanese Patent Publication No. 2012-174865 sometimes makes insufficient adhesion between a conductive polymer layer and the inorganic conductive layer. The insufficient adhesion increases contact resistance between a cathode and the conductive polymer layer so that it is difficult to reduce the ESR.

The present disclosure provides an electrolytic capacitor reducing the ESR even when using an electrolyte solution and having a high capacitance. The electrolytic capacitor includes a conductive polymer layer formed with use of a dispersion or a solution containing a conductive polymer.

Hereinafter, an exemplary embodiment of an electrolytic capacitor according to the present disclosure is described with appropriate reference to drawings. The exemplary embodiments below, however, is not to limit the present disclosure.

<<Electrolytic Capacitor>>

Figure 1:
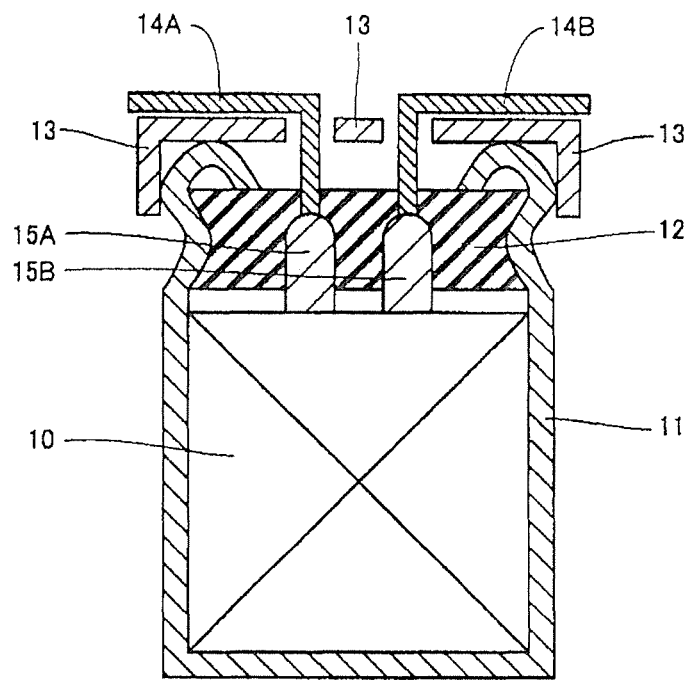
FIG. 1 is a schematic sectional view illustrating an electrolytic capacitor according to one exemplary embodiment of the present disclosure.
Figure 2:
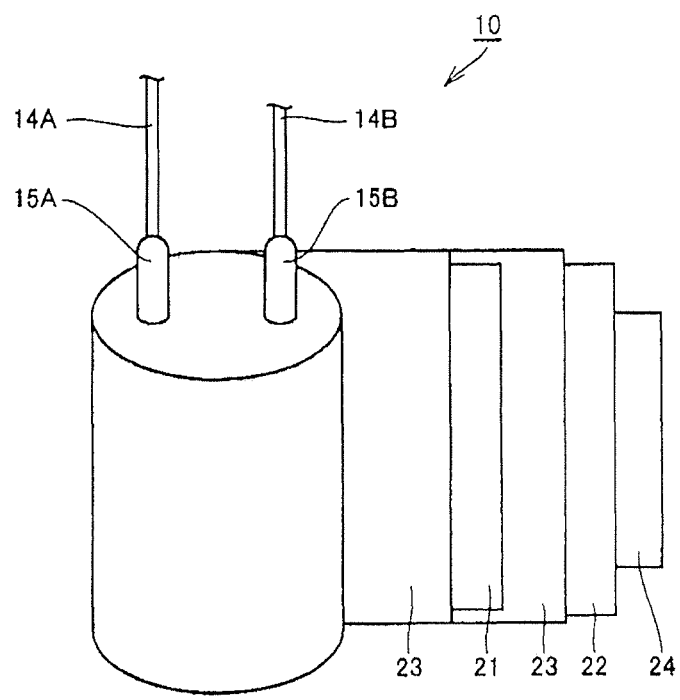
FIG. 2 is a schematic view illustrating a configuration of a capacitor element of the electrolytic capacitor in FIG. 1.

FIG. 1 is a schematic sectional view illustrating an electrolytic capacitor obtained by a production method according to one exemplary embodiment of the present disclosure. FIG. 2 is a schematic view illustrating a partially developed capacitor element included in the electrolytic capacitor.

In FIG. 1, the electrolytic capacitor includes capacitor element 10, and capacitor element 10 is housed in an outer case (specifically, bottomed case 11) together with an electrolyte solution (not shown). The outer case includes bottomed case 11 in which capacitor element 10 is housed, insulating sealing member 12 that seals an opening of bottomed case 11, and base plate 13 that covers sealing member 12. Bottomed case 11 is, at a part near an opening end, processed inward by drawing, and is, at the opening end, curled to swage sealing member 12.

As illustrated in FIG. 2, capacitor element 10 includes anode foil 21 connected to lead tab 15A, cathode foil 22 connected to lead tab 15B, and separator 23. Anode foil 21 and cathode foil 22 are wound with separator 23 interposed between the anode foil and the cathode foil, and such capacitor element 10 is also referred to as a wound body. An outermost periphery of capacitor element 10 is fixed with fastening tape 24. FIG. 2 shows partially developed capacitor element 10 before the outermost periphery of the capacitor element is fixed.

In capacitor element 10, anode foil 21 is a metal foil whose surface is roughened so as to have projections and recesses, and a dielectric layer is formed on the metal foil having the projections and recesses. Cathode foil 22 opposite to anode foil 21 is a metal foil whose surface is roughened so as to have projections and recesses, and an inorganic conductive layer is formed on the metal foil having the projections and recesses. A conductive polymer is attached to at least a part of a surface of the dielectric layer on anode foil 21 and at least a part of a surface of the inorganic conductive layer on cathode foil 22 to form a conductive polymer layer. The attaching position of the conductive polymer is not limited to this case, but the conductive polymer may be attached to any position between anode foil 21 and cathode foil 22. For example, the conductive polymer covers at least a part of the surface of the dielectric layer formed on anode foil 21, and nay further cover at least a part of the surface of the inorganic conductive layer on cathode foil 22 and/or at least a part of a surface of separator 23.

As described above, the conductive polymer layer is formed between anode foil 21 and cathode foil 22. In the electrolytic capacitor, the conductive polymer (specifically, a film including the conductive polymer) that covers at least a part of the surfaces of, for example, the anode foil, the cathode foil, and the separator is generally referred to as a solid electrolyte layer (or a conductive polymer layer) in some cases.

Hereinafter, a configuration of the electrolytic capacitor according to the exemplary embodiment of the present disclosure is described in more detail.

A capacitor element includes an anode foil on which a dielectric layer is formed, a cathode foil having a roughed surface on which an inorganic conductive layer is formed, and a conductive polymer layer interposed between the anode foil and the cathode foil. The capacitor element may also include a separator as necessary.

(Capacitor Element)
(Anode Foil)

Examples of the anode foil include a metal foil whose surface is roughened. A type of the metal that constitutes the metal foil is not particularly limited, but it is preferred to use a valve metal such as aluminum, tantalum, or niobium, or an alloy including a valve metal, from the viewpoint of facilitating formation of the dielectric layer.

Roughening the surface of the metal foil can be performed by a publicly known method. By the roughening, a plurality of projections and recesses are formed on the surface of the metal foil. The roughening is preferably performed by subjecting the metal foil to an etching treatment, for example. The etching treatment may be performed by, for example, a DC electrolytic method or an AC electrolytic method.

(Dielectric Layer)

The dielectric layer is formed on a surface of the anode foil. Specifically, the dielectric layer is formed on a roughened surface of the metal foil, so that the dielectric layer is formed along an inner wall surface of pores and pits on the surface of the anode foil.

A method for forming the dielectric layer is not particularly limited, and the dielectric layer can be formed by subjecting the metal foil to an anodizing treatment. The anodizing treatment may be performed by, for example, immersing the metal foil in a anodizing solution such as an ammonium adipate solution. In the anodizing treatment, a voltage may be applied in a state in which the metal foil is immersed in the anodizing solution, as necessary.

Normally, a large metal foil formed of, for example, a valve metal is subjected to a roughening treatment and an anodizing treatment from the viewpoint of mass productivity. In this case, the treated foil is cut into a desired size to arrange anode foil 21 on which the dielectric layer is formed.

(Cathode Foil)

A metal foil may be used for cathode foil 22. A type of the metal is not particularly limited, but it is preferred to use a valve metal such as aluminum, tantalum, or niobium, or an alloy including a valve metal.

Generally, a method for producing the conductive polymer layer is classified to two cases. One case is forming the conductive polymer layer with use of a dispersion obtained by dispersing fine particles of a conductive polymer in a dispersion medium or a solution obtained by dissolving a conductive polymer in a solvent. And the other case is forming the conductive polymer layer by polymerizing a precursor of a conductive polymer (e.g., a monomer or an oligomer that is to be a raw material of the conductive polymer) while the precursor is in contact with the anode foil and the cathode foil.

In the latter case, the polymerization proceeds on the surfaces of the anode foil and the cathode foil to form the conductive polymer layer, so that a relatively strong film is formed. The film, however, is too dense to allow an electrolyte solution to spread out on the surface of the anode foil, and thus the property of restoring a damaged dielectric layer is inferior. Further, due to strong reactivity of an oxidant for a polymerization reaction or a monomer itself, the cathode foil and the anode foil corrode to consequently deteriorate contact between the foils and the conductive polymer layer. And thus the capacitance decreases or increasing the ESR. An oxidant and a monomer that remain after the polymerization are not sufficiently taken away even by washing to adversely affect a life of the electrolytic capacitor.

In the present disclosure, the conductive polymer layer is formed with use of a dispersion obtained by dispersing fine particles of a conductive polymer in a dispersion medium, or a solution obtained by dissolving a conductive polymer in a solvent. Such a conductive polymer layer is formed by contacting the dispersion or the solution to the anode foil and the cathode foil to cause attachment of the conductive polymer to a periphery of the anode foil and the cathode foil. Such a conductive polymer layer is homogeneous, and has a high flexibility, and an excellent retainability of an electrolyte solution, but has low adhesion between the conductive polymer layer and the anode foil or the cathode foil (or the inorganic conductive layer on the surface of the cathode foil). Particularly, when an electrolyte solution is used, the electrolyte solution infiltrates between the conductive polymer layer and the inorganic conductive layer, easily hindering contact between the conductive polymer layer and the inorganic conductive layer to make it difficult to achieve a high capacitance and reduce the ESR.

Figure 3:
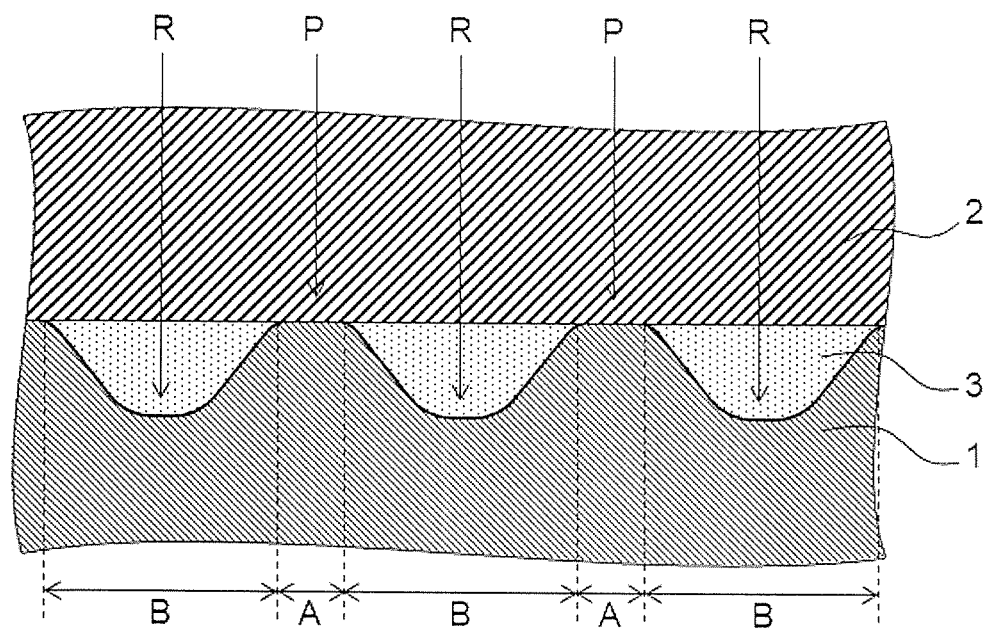
FIG. 3 is an enlarged schematic diagram in the vicinity of the boundary between the conductive polymer layer and the inorganic conductive layer in the electrolytic capacitor of the present disclosure.

In the present disclosure, the surface of the cathode foil is roughened and the inorganic conductive layer is formed on the roughened surface, so that the adhesion between the conductive polymer layer and the inorganic conductive layer can be increased in spite of forming the conductive polymer layer with use of the dispersion or the solution. FIG. 3 is an enlarged schematic diagram in the vicinity of the boundary between the conductive polymer layer and the inorganic conductive layer. In specific description referring FIG. 3, the inorganic conductive layer (1) is formed on the roughed surface of the cathode foil to form projections (P) and recesses (R) also on a surface of the inorganic conductive layer that is in contact with the conductive polymer layer (2). The projections (P) on the surface of the inorganic conductive layer (1) form a first region (A) where the inorganic conductive layer (1) is in contact with the conductive polymer layer (2), whereas the recesses (R) form a second region (B) where the inorganic conductive layer (1) is not in contact with the conductive polymer layer (2). In the second region (B), a gap is formed between the inorganic conductive layer (1) and the conductive polymer layer (2), so that even when an electrolyte solution (3) infiltrates between the inorganic conductive layer (1) and the conductive polymer layer (2), the electrolyte solution (3) flows into the gap. Therefore, in the first region (A), the electrolyte solution (3) is prevented from entering between the conductive polymer layer (2) and the inorganic conductive layer (1), or an amount of the electrolyte solution (3) between the layers decreases that enters or remains between the layers. As a result, it is possible to secure a high contact pressure, suppress a decrease in adhesion between the conductive polymer layer (2) and the inorganic conductive layer (1), and suppress an increase in resistance of an interface.

A degree of surface roughening of the cathode foil can be represented by a surface expansion rate. The surface expansion rate on the surface of the cathode foil ranges, for example, from 1.3 $cm^2/cm^2$ to 550 $cm^2/cm^2$, inclusive, preferably from 1.5 $cm^2/cm^2$ to 500 $cm^2/cm^2$, inclusive, further preferably from 2 $cm^2/cm^2$ to 120 $cm^2/cm^2$, inclusive. With the surface of the cathode foil having a surface expansion rate in these ranges, the first region and the second region are formed in a good balance to allow easy securement of high adhesion between the conductive polymer layer and the inorganic conductive layer. Further, with the surface of the cathode foil having a surface expansion rate in these ranges, it is easy to suppress attachment or adsorption of, for example, moisture, a byproduct, or gas to the surface of the cathode foil before the inorganic conductive layer is formed. As a result, a more homogeneous inorganic conductive layer is easily formed, also from such a viewpoint, easily suppress to decrease adhesion. With the surface of the cathode foil having a surface expansion rate ranging from 10 $cm^2/cm^2$ to 60 $cm^2/cm^2$, inclusive, it is possible to further suppress to decrease adhesion, so that a decrease in capacitance and an increase in ESR can be suppressed in use of the electrolytic capacitor for a long period.

Roughening the surface of the cathode foil can be performed by a publicly known method, and the roughening may be performed by etching. The etching treatment may be performed by, for example, a DC electrolytic method or an AC electrolytic method. From the viewpoint of easily securing a high capacitance even when repeating charging and discharging, the roughening is preferred to be performed by etching.

(Inorganic Conductive Layer)

The inorganic conductive layer is desired to be formed of an inorganic material having conductivity and is distinguished from a conductive polymer layer formed of an organic material.

Examples of the conductive inorganic material that forms the inorganic conductive layer include, in addition to conductive carbon, a metal and a conductive metal compound. Examples of the conductive carbon include amorphous carbon, carbon black such as acetylene black, soft carbon, hard carbon, graphite, and a carbon fiber such as a carbon nanotube. As the metal and the metal compound, one that is less likely to form a passive film by, for example, contacting with air is preferred. Examples of the metal include titanium, a titanium alloy, nickel, and a nickel alloy. Examples of the metal compound include a nitride and a carbide, and a nitride is preferable. As a metal that constitutes the metal compound, there can be exemplified titanium and/or nickel. The inorganic conductive layer may include one of these inorganic materials or two or more of these inorganic materials.

Although the inorganic conductive layer may include the conductive inorganic material and a binder, a ratio of the conductive inorganic material is preferred to be as high as possible. An proportion of the conductive inorganic material in the inorganic conductive layer is preferably 95% by mass or more or 99% by mass or more, for example. In addition, the inorganic conductive layer may be a layer formed of the conductive inorganic material. The inorganic conductive layer may be formed by forming a layer including the conductive inorganic material and a binder and removing the binder by a heat treatment. Especially, the inorganic conductive layer is preferred to be a deposited film of the conductive inorganic material (particularly, conductive carbon such as amorphous carbon).

Even when the cathode foil and the inorganic conductive layer are formed of the same material, a distribution of a metal is different between the cathode foil and the inorganic conductive layer (for example, the distribution of a metal is rougher in the inorganic conductive layer than in the cathode foil), so that it is possible to distinguish the cathode foil from the inorganic conductive layer in a sectional electron micrograph.

From the viewpoint of increasing adhesion between the inorganic conductive layer and the cathode foil, the inorganic conductive layer may further include a conductive base layer as necessary. The base layer that constitutes a part of the inorganic conductive layer is preferred to include a conductive inorganic material such as a metal or a conductive metal compound among the conductive inorganic materials exemplified above. As the metal, titanium is preferable, and as the metal compound, a titanium nitride is preferable.

A thickness of the inorganic conductive layer ranges, for example, from 1 nm to 10 μm, inclusive. When the inorganic conductive layer is a deposited film, the thickness of the inorganic conductive layer ranges, for example, from 1 nm to 100 nm, inclusive. When the inorganic conductive layer is formed of a layer including the conductive inorganic material and a binder, the thickness of the inorganic conductive layer may range, for example, from 100 nm to 10 μm, inclusive. The thickness of the inorganic conductive layer may be an average thickness obtained by averaging thicknesses measured at a plurality of points (e.g., 10 points) in a sectional image.

The inorganic conductive layer having a thickness in the ranges described above easily suppresses a decrease in adhesion between the inorganic conductive layer and the conductive polymer layer to allow easy securement of high conductivity.

(Separator)

As separator 23, for example, a nonwoven fabric may be used that includes a fiber of, for example, cellulose, polyethylene terephthalate, a vinylon, or a polyamide (e.g., an aliphatic polyamide and an aromatic polyamide such as aramid).

Capacitor element 10 can be manufactured by a publicly known method. For example, capacitor element 10 may be manufactured by stacking anode foil 21 on which the dielectric layer is formed and cathode foil 22 on which the inorganic conductive layer is formed, with separator 23 interposed between the anode foil and the cathode foil, and then forming the conductive polymer layer between anode foil 21 and cathode foil 22. Capacitor element 10 may also be manufactured by winding anode foil 21 on which the dielectric layer is formed and cathode foil 22 on which the inorganic conductive layer is formed, with separator 23 interposed between the anode foil and the cathode foil, to form a wound body as illustrated in FIG. 2, and forming the conductive polymer layer between anode foil 21 and cathode foil 22. When the wound body is formed, the winding may be performed while lead tabs 15A, 15B are rolled in the anode foil, the cathode foil, and the separator, to cause lead tabs 15A, 15B to stand up from the wound body as illustrated in FIG. 2.

A material for lead tabs 15A, 15B is not particularly limited as long as the material is a conductive material. Surfaces of lead tabs 15A, 15B may be subjected to an anodizing treatment. Further, lead tabs 15A, 15B may be covered with a resin material at a part in contact with sealing member 12 and a part connected to lead wires 14A, 14B.

A material for lead wires 14A, 14B connected to lead tabs 15A, 15B, respectively, is not also particularly limited, and, for example, a conductive material may be used.

An end of an outer surface of anode foil 21, cathode foil 22 or separator 23 that is positioned at an outermost layer of the wound body (cathode foil 22 in FIG. 2) is fixed with fastening tape 24. When anode foil 21 is arranged by cutting a large metal foil, the capacitor element in a state of, for example, the wound body, may further be subjected to an anodizing treatment in order to provide a dielectric layer on a cutting surface of anode foil 21.

(Conductive Polymer Layer)

The conductive polymer layer is interposed between anode foil 21 and cathode foil 22. The conductive polymer layer is preferably formed on at least a part of a surface of the dielectric layer formed on the surface of anode foil 21, so as to cover the dielectric layer. The conductive polymer layer is more preferably formed so as to cover as large a region of the dielectric layer as possible. The conductive polymer layer is preferably formed on at least a part of a surface of the inorganic conductive layer formed on the surface of cathode foil 22, so as to cover the inorganic conductive layer. The conductive polymer layer is more preferably formed so as to cover as large a region of the inorganic conductive layer as possible. When the capacitor element includes the separator, the conductive polymer layer may be formed on not only the surfaces of the dielectric layer and the inorganic conductive layer but also a surface of the separator.

When the conductive polymer layer is formed with use of the dispersion obtained by dispersing fine particles of a conductive polymer in a dispersion medium, a diameter of the fine particles of the conductive polymer is preferred to be smaller than a diameter of the recesses on the roughened surface of the cathode foil. The fine particles of the conductive polymer having such a diameter can attach also to a surface of recesses on the inorganic conductive layer to reduce the ESR of the electrolytic capacitor.

(Conductive Polymer)

Examples of the conductive polymer included in the conductive polymer layer include polypyrrole, polythiophene, polyfuran, polyaniline, polyacetylene, polyphenylene, polyphenylene vinylene, polyacene, and polythiophene vinylene. These conductive polymers may be used alone or in combination of two or more conductive polymers, or may be a copolymer of two or more monomers.

In the present specification, polypyrrole, polythiophene, polyfuran, polyaniline, and the like mean polymers having, as a basic skeleton, polypyrrole, polythiophene, polyfuran, polyaniline, and the like, respectively. Therefore, polypyrrole, polythiophene, polyfuran, polyaniline, and the like also include derivatives of polypyrrole, polythiophene, polyfuran, polyaniline, and the like, respectively. For example, polythiophene includes poly(3,4-ethylenedioxythiophene) and the like.

These conductive polymers may be used alone or in combination of two or more conductive polymers.

A weight average molecular weight of the conductive polymer is not particularly limited and ranges, for example, from 1,000 to 1,000,000, inclusive.

(Dopant)

The conductive polymer layer may include a dopant. The dopant may be included in the conductive polymer layer while doped in the conductive polymer, or may be included in the conductive polymer layer while bound with the conductive polymer.

As the dopant, a polyanion can be used. Specific examples of the polyanion include polyanions such as polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. Especially, a polyanion derived from polystyrenesulfonic acid is preferable. These polyanions may be used alone or in combination of two or more polyanions. Further, these polyanions may be a polymer of a single monomer or a copolymer of two or more monomers.

A weight average molecular weight of the polyanion is not particularly limited and ranges, for example, from 1,000 to 1,000,000, inclusive. The conductive polymer including such a polyanion is easily and homogeneously dispersed in a solvent, facilitating uniform attachment of the conductive polymer to the surfaces of the dielectric layer and the inorganic conductive layer.

(Electrolyte Solution)

In a solid electrolytic capacitor, a high capacitance is expected by forming on a surface of a cathode foil an inorganic conductive layer such as a carbon layer. With use of an electrolyte solution, however, it is difficult to suppress generation of an electrostatic capacity in a cathode. Therefore, it has been conventionally considered that it is difficult to actually achieve a high capacitance even with a combination of the inorganic conductive layer and the electrolyte solution. In the present disclosure, however, it has been found that when the inorganic conductive layer is formed on the roughened surface of the cathode foil and the conductive polymer layer is formed with use of the dispersion or the solution containing the conductive polymer, a decrease in adhesion between the conductive polymer layer and the inorganic conductive layer can surprisingly be suppressed to allow securement of a high capacitance and reduce the ESR, even with use of the electrolyte solution. Further, the electrolytic capacitor including the electrolyte solution can further improve a function of restoring the dielectric layer.

As the electrolyte solution, a nonaqueous solvent may be used, or a solution may also be used that contains a nonaqueous solvent and an ionic substance (solute) dissolved in the nonaqueous solvent. The nonaqueous solvent is a collective term for liquids other than water and liquids containing water, and includes an organic solvent and an ionic liquid.

Examples of the nonaqueous solvent include a polyol (e.g., alkylene glycols such as ethylene glycol and propylene glycol; polyalkylene glycols such as polyethylene glycol; and glycerins such as glycerin and polyglycerin), cyclic sulfones such as sulfolane, lactones such as γ-butyrolactone (γBL), amides such as N-methylacetamide, N,N-dimethylformamide, and N-methyl-2-pyrrolidone, esters such as methyl acetate, ethers such as 1,4-dioxane, ketones such as methyl ethyl ketone, and formaldehyde. A single one or two or more in combination of the nonaqueous solvents may be used.

The electrolyte solution preferably contains at least a solvent (first solvent) having no boiling point or having a high boiling point (e.g., 180° C. or more) among the nonaqueous solvents described above. The electrolyte solution containing the first solvent can suppress depletion of the electrolyte solution even when the electrolytic capacitor is used for a long period, so that it is possible to secure high reliability over a long period. The electrolyte solution containing the first solvent, however, is likely to impair the adhesion between the conductive polymer layer and the inorganic conductive layer by infiltrating between the layers through repetition of charging and discharging. Particularly, when a non-roughened cathode foil is used, the use of the electrolyte solution containing the first solvent decreases the adhesion between the conductive polymer layer and the inorganic conductive layer to decrease the conductivity, so that it is impossible to secure a capacitance and reduce the ESR. In the present disclosure, the inorganic conductive layer is formed on the roughened surface of the cathode foil, so that it is possible to secure high adhesion between the conductive polymer layer and the inorganic conductive layer even when the electrolyte solution contains the first solvent.

The boiling point of the first solvent should be 180° C. or more and may be 200° C. or more. As the first solvent, a polyol is preferable. For example, polyethylene glycol and polyglycerin sometimes do not have a boiling point depending on molecular weights of polyethylene glycol and polyglycerin. Such a compound (limited to a liquid, however) is also preferable as the first solvent.

In the meantime, the first solvent is not necessarily contained in the electrolyte solution used to assemble the electrolytic capacitor, but the first solvent may be contained in a treatment solution used in a process of assembling the electrolytic capacitor. For example, the dispersion or the solution containing the conductive polymer may contain the first solvent. From the viewpoint of easily securing the adhesion between the conductive polymer layer and the cathode foil, a proportion of the first solvent contained in the dispersion or the solution is preferably 50% by mass or less in the dispersion or the solution. The first solvent having no boiling point or having a high boiling point remains in the electrolytic capacitor assembled. The first solvent that has remained oozes into the electrolyte solution housed in the electrolytic capacitor, so that the electrolyte solution in the electrolytic capacitor comes to contain the first solvent.

The proportion of the first solvent contained in the electrolyte solution ranges, for example, from 3% by mass to 90% by mass, inclusive, preferably from 10% by mass to 80% by mass, inclusive. The proportion of the first solvent contained in the electrolyte solution may also be set to a range from 10% by mass to 30% by mass, inclusive. The electrolyte solution having a proportion of the first solvent in such ranges can suppress a decrease in adhesion between the conductive polymer layer and the inorganic conductive layer and increase the function of restoring the dielectric layer.

As the solute contained in the electrolyte solution, there can be exemplified a salt of an anion and a cation, and an organic salt is preferable, in which at least one of the anion and the cation is an organic substance. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate. A single one or two or more in combination of the solutes may be used.

<<Method for Producing Electrolytic Capacitor>>

Hereinafter, one example of a method for producing the electrolytic capacitor according to the exemplary embodiment of the present disclosure is described according to each of steps.

The electrolytic capacitor can be obtained through the steps of: preparing a dispersion or a solution (first treatment solution) containing a conductive polymer (first step); arranging an anode foil on which a dielectric layer is formed (second step); arranging a cathode foil on which an inorganic conductive layer is formed (third step); obtaining a capacitor element by impregnating with the first treatment solution the anode foil, the cathode foil, and a separator interposed between the anode foil and the cathode foil, as necessary (fourth step); and impregnating the capacitor element with an electrolyte solution (fifth step). A conductive polymer layer can be formed through the fourth step. A solvent component may be removed in an appropriate stage.

(i) First Step

In the first step, a first treatment solution is prepared that contains a conductive polymer (and a dopant) and a solvent (second solvent).

The first treatment solution can be obtained by, for example, dispersing or dissolving the conductive polymer (and the dopant) in the second solvent. Alternatively, the first treatment solution can also be obtained by, for example, polymerizing in the second solvent a raw material of the conductive polymer (e.g., a precursor such as a monomer and/or an oligomer of the conductive polymer) in presence of the dopant. In the case of preparing the first treatment solution through polymerization, an unreacted raw material and a byproduct may be removed as necessary. Alternatively, polymerization may be performed with use of a part of the second solvent to give a mixture to which the remaining part of the second solvent may be added.

The second solvent is not particularly limited, and may be water or a nonaqueous solvent (e.g., an organic solvent and an ionic liquid). Especially, the second solvent is preferably a polar solvent. The polar solvent may be a protic solvent or an aprotic solvent.

Examples of the protic solvent include a monohydric alcohol (e.g., methanol, ethanol, propanol, and butanol); a polyol (e.g., alkylene glycols such as ethylene glycol and propylene glycol, polyalkylene glycols such as polyethylene glycol, and glycerins such as glycerin and polyglycerin);

glycol monoethers such as diethylene glycol monobutyl ether; formaldehyde; and water.

Examples of the aprotic solvent include amides such as N-methylacetamide, N,N-dimethylformamide, and N-methyl-2-pyrrolidone; esters such as methyl acetate; ketones such as methyl ethyl ketone and γ-butyrolactone; ethers (cyclic ethers) such as 1,4-dioxane; sulfones such as dimethyl sulfoxide and sulfolane; and carbonate compounds (e.g., cyclic carbonates) such as propylene carbonate.

Especially, the second solvent is preferably a protic solvent. From the viewpoint of increasing handleability of the first treatment solution and dispersibility of the conductive polymer, the second solvent preferably contains water. The second solvent containing a polyol is likely to increase the conductivity of the conductive polymer layer (in other words, likely to further decrease the ESR). Accordingly, the second solvent containing a polyol is also preferable, and use of the second solvent is also preferable that contains at least water and a polyol.

The first treatment solution is preferably a dispersion obtained by dispersing the conductive polymer (and the dopant) in the second solvent. In the dispersion, the conductive polymer and/or the dopant is preferred to be particles (or a powder). An average particle size of the particles dispersed in the dispersion preferably ranges from 5 nm to 100 nm, inclusive. The average particle size can be determined, for example, from a particle size distribution obtained by a dynamic light scattering method.

A ratio of the dopant contained in the first treatment solution preferably ranges from 10 parts by mass to 1,000 parts by mass, inclusive, more preferably from 50 parts by mass to 200 parts by mass, inclusive, relative to 100 parts by mass of the conductive polymer.

A concentration of the conductive polymer (including the dopant or a polyanion) in the first treatment solution preferably ranges from 0.5% by mass to 3% by mass, inclusive. The first treatment solution having such a concentration of the conductive polymer is suitable for attachment of an appropriate amount of the conductive polymer and is easily impregnated to also give advantages for productivity improvement.

The first treatment solution may contain, for example, a publicly known additive as necessary.

(ii) Second Step

In the second step, a surface of an anode foil is subjected to, for example, an anodizing treatment to form a dielectric layer on the surface of the anode foil, as described above.

(iii) Third Step

In the third step, a cathode foil is arranged on a surface of which an inorganic conductive layer is formed.

The inorganic conductive layer can be formed by a method such as attaching a powder conductive inorganic material to the surface of the cathode foil or vacuum vapor deposition. Alternatively, the inorganic conductive layer may also be formed by forming a coated film by coating the surface of the cathode foil with a paste or a slurry containing a conductive inorganic material and a binder, and drying the coated film or removing the binder by subjecting the coated film to a heat treatment.

The inorganic conductive layer including a deposited film of a conductive inorganic material (particularly, conductive carbon such as amorphous carbon) can be formed by depositing, for example, the inorganic material on the surface of the cathode foil by a gas phase method such as chemical vapor deposition, vacuum vapor deposition, sputtering, or ion plating. For example, the inorganic conductive layer including a metal nitride may be formed by performing the gas phase method in a nitrogen gas atmosphere.

In the third step, the inorganic conductive layer may be formed by forming a base layer on the surface of the cathode foil as necessary and forming, as described above, a layer including the conductive inorganic material on the base layer. The base layer constituting the inorganic conductive layer can be formed, in the same manner as described above, with use of the conductive inorganic material such as a metal or a conductive compound. The base layer is preferred to be formed by depositing the conductive inorganic material on the surface of the cathode foil by the gas phase method.

(iv) Fourth Step

In the fourth step, the first treatment solution is impregnated into the anode foil on which the dielectric layer is formed, the cathode foil on which the inorganic conductive layer is formed, and a separator as necessary. More specifically, in the fourth step, the first treatment solution may be impregnated into a wound body obtained by winding the anode foil on which the dielectric layer is formed and the cathode foil on which the inorganic conductive layer is formed, with the separator interposed between the anode foil and the cathode foil. The impregnation with the first treatment solution may be performed by immersing the wound body in the first treatment solution or injecting the first treatment solution into the wound body. In the meantime, the inorganic conductive layer can be formed by roughening a surface of the cathode foil and depositing an inorganic material having conductivity on the roughened surface of the cathode foil by the gas phase method.

The impregnation with the first treatment solution may be performed under atmospheric pressure, but may also be performed under a reduced pressure, in an atmosphere ranging, for example, from 10 kPa to 100 kPa, inclusive, preferably from 40 kPa to 100 kPa, inclusive. The impregnation may also be performed under ultrasonic vibration as necessary. An impregnation period depends on a size of capacitor element 10, and ranges, for example, from 1 second to 5 hours, inclusive, preferably from 1 minute to 30 minutes, inclusive.

The anode foil and the cathode foil (and further the separator) may be dried as necessary after impregnated with the first treatment solution. The drying removes at least a part of the second solvent. The drying may be performed by heating, and may also be performed under a reduced pressure as necessary.

As described above, the conductive polymer layer is formed between the anode foil and the cathode foil through the fourth step to thus form capacitor element 10.

(v) Fifth Step

In the fifth step, the capacitor element obtained in the fourth step is impregnated with an electrolyte solution.

The impregnation of capacitor element 10 with the electrolyte solution is not particularly limited and can be performed by a publicly known method. For example, capacitor element 10 may be immersed in the electrolyte solution, or the electrolyte solution may be injected into a container housing capacitor element 10. The impregnation of capacitor element 10 with the electrolyte solution may be performed under a reduced pressure (e.g., 10 kPa to 100 kPa) as necessary.

(Others)

Capacitor element 10 may be encapsulated. More specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or alloys of these metals.

Next, sealing member 12 formed so as to allow lead wires 14A, 14B to penetrate the sealing member is disposed above capacitor element 10 to encapsulate capacitor element 10 in bottomed case 11. Sealing member 12 is sufficient as long as the sealing member is an insulating substance. As the insulating substance, an elastic body is preferable, and especially preferred is, for example, a high heat resistance silicone rubber, fluororubber, ethylene propylene rubber, chlorosulfonated polyethylene rubber (e.g., Hypalon rubber), butyl rubber or isoprene rubber.

Next, bottomed case 11 is, at a part near an opening end, processed by transverse drawing, and is, at the opening end, curled to swage sealing member 12. Then, base plate 13 is disposed on a curled part of the bottomed case to complete the electrolytic capacitor as illustrated in FIG. 1. Then, an aging treatment may be performed while a rated voltage is applied.

In the exemplary embodiments described above, a wound electrolytic capacitor has been described. The application range of the present disclosure, however, is not limited to the wound electrolytic capacitor and can also be applied to other electrolytic capacitors such as a chip electrolytic capacitor including a metal sintered body in place of the anode foil, and a laminated electrolytic capacitor including a metal plate in place of the anode foil.

EXAMPLES

Hereinafter, the present disclosure is specifically described with reference to examples and comparative examples. The present disclosure, however, is not limited to the examples below.

Example 1

A wound electrolytic capacitor having a rated voltage of 35 V and a rated electrostatic capacity of 47 µF, as illustrated in FIG. 1, was manufactured in the following procedure, and evaluation for the electrolytic capacitor was conducted.
(1) Production of Electrolytic Capacitor
(Preparation of Anode Foil Having Dielectric Layer)

A 100-µm-thick aluminum foil was subjected to an etching treatment to roughen a surface of the aluminum foil. Then, a dielectric layer was formed on the surface of the aluminum foil by an anodizing treatment with an ammonium adipate aqueous solution to arrange an anode foil having the dielectric layer.
(Preparation of Cathode Foil Having Inorganic Conductive Layer)

A cathode foil was arranged on a surface of which an inorganic conductive layer was formed. As the cathode foil, an aluminum foil (thickness: 30 µm) was used whose surface was roughened by an etching treatment and which had a surface expansion rate of 30 $cm^2/cm^2$. The inorganic conductive layer was formed on the surface of the cathode foil by ion plating of conductive carbon. A thickness of the inorganic conductive layer was 8 nm.
(Manufacturing of Wound Body)

An anode lead tab and a cathode lead tab were connected to the anode foil and the cathode foil, respectively, and the anode foil and the cathode foil were would with a separator interposed between the anode foil and the cathode foil while the lead tabs were rolled in the anode foil, the cathode foil and the separator, to give a wound body. Ends of the lead tabs protruding from the wound body were connected to an anode lead wire and a cathode lead wire, respectively. Then, the manufactured wound body was subjected to an anodizing treatment again to form a dielectric layer at a cutting end of the anode foil. Next, an end of an outer surface of the wound body was fixed with a fastening tape.
(Preparation of First Treatment Solution)

A mixed solution was prepared by dissolving 3,4-ethylenedioxythiophene and a dopant, i.e., polystyrenesulfonic acid in ion-exchanged water. Ferric sulfate and sodium persulfate (an oxidant) dissolved in ion-exchanged water were added to the resultant solution while the solution was stirred, to cause a polymerization reaction. After the reaction, a resultant reaction solution was dialyzed to remove unreacted monomers and an excessive oxidant, so that a dispersion liquid was obtained that included poly(3,4-ethylene dioxythiophene) doped with polystyrenesulfonic acid (PEDOT-PSS). A concentration of PEDOT-PSS in the dispersion liquid was about 2% by mass, and a mass ratio between PSS and PEDOT (=PSS:PEDOT) was about 2:1. Ethylene glycol (second solvent) at 5% by mass was added to the resultant dispersion liquid and stirred to prepare a first treatment solution having a state of a dispersion liquid.
(Impregnation with First Treatment Solution)

The wound body was impregnated with the first treatment solution for 5 minutes. Next, the wound body was heated at 150° C. for 20 minutes to remove a solvent component. Thus, a capacitor element was manufactured in which a conductive polymer layer was formed between the anode foil and the cathode foil.
(Impregnation with Electrolyte Solution)

Next, the capacitor element was impregnated with an electrolyte solution under a reduced pressure. Used as the electrolyte solution was a solution containing γBL, glycerin, and mono(ethyldimethylamine) phthalate (solute) at a mass ratio of 50:25:25. In the electrolyte solution, γBL and glycerin are a first solvent.
(Encapsulation of Capacitor Element)

The electrolyte solution-impregnated capacitor element was housed in an outer case as illustrated in FIG. 1 and encapsulated to manufacture an electrolytic capacitor. A total of 300 electrolytic capacitors were manufactured in the same manner.
(2) Evaluation of Performance
(a) Electrostatic Capacity and ESR Value An electrostatic capacity (µF) and an ESR value (mΩ) were measured as initial characteristics of the electrolytic capacitor. Specifically, an initial electrostatic capacity (µF) at a frequency of 120 Hz was measured for the electrolytic capacitor with an LCR meter for 4-terminal measurement. In addition, an ESR value (mΩ) at a frequency of 100 kHz was measured for the electrolytic capacitor with an LCR meter for 4-terminal measurement.

Also measured in the same manner as in the initial characteristics described above were an electrostatic capacity (µF) and an ESR value (mΩ) after a test of leaving the electrolytic capacitor to stand at a high temperature of 125° C. for 4000 hours.

The electrostatic capacities and the ESR values were measured for each randomly selected 120 electrolytic capacitors, and average values for the electrostatic capacities and the ESR values were calculated.
(b) Proportion of First Solvent in Electrolyte Solution The electrolyte solution was extracted from the electrolytic capacitor, and a proportion (% by mass) of the first solvent contained in the electrolyte solution was measured by gas chromatography. The measurement result indicated that the proportion of the first solvent in the electrolyte solution was 76% by mass.

Comparative Example 1

An electrolytic capacitor was manufactured in the same manner as in Example 1 except for using as the cathode foil a non-roughened aluminum foil (thickness: 20 μm), and the evaluation of performance was conducted. The aluminum foil used had a surface expansion rate of 1 cm$^2$/cm$^2$.

Example 2

An electrolytic capacitor was manufactured in the same manner as in Example 1 except for using as the cathode foil an aluminum foil (thickness: 30 μm) whose surface was roughened by an etching treatment and had a surface expansion rate of 1.5 cm$^2$/cm$^2$, and the evaluation of performance was conducted.

Example 3

An electrolytic capacitor was manufactured in the same manner as in Example 1 except for using as the cathode foil an aluminum foil (thickness: 20 μm) whose surface was roughened by an etching treatment and had a surface expansion rate of 2 cm$^2$/cm$^2$, and the evaluation of performance was conducted.

Example 4

An electrolytic capacitor was manufactured in the same manner as in Example 1 except for using as the cathode foil an aluminum foil (thickness: 20 μm) whose surface was roughened by an etching treatment and had a surface expansion rate of 10 cm$^2$/cm$^2$, and the evaluation of performance was conducted.

Example 5

An electrolytic capacitor was manufactured in the same manner as in Example 1 except for using as the cathode foil an aluminum foil (thickness: 40 μm) whose surface was roughened by an etching treatment and had a surface expansion rate of 60 cm$^2$/cm$^2$, and the evaluation of performance was conducted.

Example 6

An electrolytic capacitor was manufactured in the same manner as in Example 1 except for using as the cathode foil an aluminum foil (thickness: 50 μm) whose surface was roughened by an etching treatment and had a surface expansion rate of 80 cm$^2$/cm$^2$, and the evaluation of performance was conducted.

Example 7

An electrolytic capacitor was manufactured in the same manner as in Example 1 except for using as the cathode foil an aluminum foil (thickness: 70 μm) whose surface was roughened by an etching treatment and had a surface expansion rate of 120 cm$^2$/cm$^2$, and the evaluation of performance was conducted.

Example 8

An electrolytic capacitor was manufactured in the same manner as in Example 1 except for using as the cathode foil an aluminum foil (thickness: 130 μm) whose surface was roughened by an etching treatment and had a surface expansion rate of 500 cm$^2$/cm$^2$, and the evaluation of performance was conducted.

Example 9

An electrolytic capacitor was manufactured in the same manner as in Example 1 except for forming an inorganic conductive layer (thickness 10 nm) on the surface of the cathode foil by vacuum vapor deposition of nickel, and the evaluation of performance was conducted.

Example 10

An electrolytic capacitor was manufactured in the same manner as in Example 1 except for forming an inorganic conductive layer (thickness 10 nm) made from a titanium nitride on the surface of the cathode foil by vacuum vapor deposition, and the evaluation of performance was conducted.

Comparative Example 2

An electrolytic capacitor was manufactured in the same manner as in Example 5 except for using the same cathode foil as the cathode foil in Example 5 without forming an inorganic conductive layer on the cathode foil, and the evaluation of performance was conducted.

Comparative Example 3

A solution was prepared by mixing 1 part by mass of 3,4-ethylenedioxythiophene as a polymerizable monomer, 2 parts by mass of ferric p-toluenesulfonate that served as an oxidant and a dopant component, and 4 parts by mass of n-butanol as a solvent. A wound body manufactured in the same manner as in Example 1 was immersed in the resultant solution, picked up from the solution and left to stand at 85° C. for 60 minutes to manufacture a capacitor element in which the conductive polymer layer was formed between the anode foil and the cathode foil. An electrolytic capacitor was manufactured in the same manner as in Example 1 except for using the resultant capacitor element, and the evaluation of performance was conducted. The proportion of the first solvent in the electrolyte solution of the electrolytic capacitor was 75% by mass.

Comparative Example 4

In Comparative Example 4, a solid electrolytic capacitor was manufactured that did not include an electrolyte solution. In the same manner as in Example 1, a capacitor element was manufactured in which the conductive polymer layer was formed between the anode foil and the cathode foil. The resultant capacitor element was housed in an outer case and encapsulated to give a solid electrolytic capacitor, and the evaluation of performance was conducted in the same manner as in Example 1.

Table 1 shows results of the examples and the comparative examples. A1 to A10 denote Examples 1 to 10, and B1 to B4 denote Comparative Examples 1 to 4.

TABLE 1

| | Electrostatic capacity (µF) | | ESR (mΩ) | |
|---|---|---|---|---|
| | Initial | After 4000 hours | Initial | After 4000 hours |
| B1 | 54.5 | 41.0 | 100.0 | 210.0 |
| A2 | 55.0 | 46.0 | 69.0 | 120.0 |
| A3 | 55.0 | 48.0 | 68.0 | 105.0 |
| A4 | 55.5 | 49.5 | 63.0 | 98.0 |
| A1 | 55.5 | 49.5 | 63.0 | 98.0 |
| A5 | 55.5 | 49.5 | 63.0 | 98.5 |
| A6 | 55.0 | 48.5 | 66.0 | 102.0 |
| A7 | 55.0 | 48.5 | 67.0 | 106.0 |
| A8 | 54.0 | 46.0 | 68.0 | 115.0 |
| A9 | 55.0 | 48.5 | 69.0 | 102.5 |
| A10 | 55.0 | 49.0 | 69.5 | 105.0 |
| B2 | 47.0 | 37.0 | 63.0 | 96.0 |
| B3 | 55.5 | 40.0 | 70.0 | 155.0 |
| B4 | 55.0 | 37.0 | 70.0 | 120.5 |

In the examples, the initial electrostatic capacity was high and the initial ESR was suppressed low as shown in Table 1. In Comparative Example 1 where the non-roughened cathode foil was used, the initial electrostatic capacity was high but the ESR increased. In Comparative Example 2 where an inorganic conductive layer was not formed, the electrostatic capacity decreased. In Comparative Example 3 where the conductive polymer layer was formed by polymerization, the ESR increased.

In the examples, a relatively high electrostatic capacity could be secured and an increase in ESR was suppressed, even after the electrolytic capacitor was left to stand at the high temperature for 4000 hours. In contrast, after the electrolytic capacitor was left to stand at the high temperature for 4000 hours, the electrostatic capacity decreased and the ESR remarkably increased in Comparative Examples 1 and 3, and the electrostatic capacity largely decreased in Comparative Example 2.

Comparative Example 4 had a larger value of an increase in a leakage current value, which is not shown in Table 1, after the electrolytic capacitor was left to stand at the high temperature for 4000 hours, than Examples 1 to 10 and Comparative Example 1 to 4 had.

The present disclosure can be utilized for an electrolytic capacitor including a conductive polymer layer and an electrolyte solution.

What is claimed is:

1. An electrolytic capacitor comprising:
   a capacitor element; and
   an electrolyte solution,
   the capacitor element including:
      an anode foil on which a dielectric layer is formed;
      a cathode foil on which an inorganic layer is formed, the cathode foil being opposite to the anode foil; and
      a conductive polymer layer including a conductive polymer, the conductive polymer layer being disposed between the anode foil and the cathode foil, wherein:
   the inorganic layer has a surface having projections and recesses, and
   the projections form a region where the inorganic layer is in contact with the conductive polymer layer and the recesses form a region where the inorganic layer is not in contact with the conductive polymer layer.

2. The electrolytic capacitor according to claim 1, wherein the inorganic layer includes at least one selected from the group consisting of carbon, nickel, a nickel compound, titanium, and a titanium compound.

3. The electrolytic capacitor according to claim 1, wherein the inorganic layer includes at least one selected from the group consisting of titanium, and a titanium compound.

4. The electrolytic capacitor according to claim 1, wherein:
   the cathode foil has a roughened surface and
   the roughened surface of the cathode foil has a surface expansion rate ranging from 1.5 $cm^2/cm^2$ to 500 $cm^2/cm^2$, inclusive.

5. The electrolytic capacitor according to claim 1, wherein the roughened surface of the cathode foil is provided by etching.

6. The electrolytic capacitor according to claim 1, wherein the electrolyte solution contains a first solvent having no boiling point or a boiling point of 180° C. or more.

7. The electrolytic capacitor according to claim 6, wherein the first solvent contains a polyol.

8. The electrolytic capacitor according to claim 6, wherein a proportion of the first solvent contained in the electrolyte solution is ranging from 3% by mass to 90% by mass, inclusive.

9. The electrolytic capacitor according to claim 1, wherein the conductive polymer layer is formed with use of a dispersion containing the conductive polymer or a solution containing the conductive polymer.

10. An electrolytic capacitor comprising:
    a capacitor element; and
    an electrolyte solution,
    the capacitor element including:
       an anode foil on which a dielectric layer is formed;
       a cathode foil which is opposite to the anode foil and on which a first layer including at least one selected from the group consisting of carbon, nickel, a nickel compound, titanium, and a titanium compound is formed;
       a separator that is disposed between the anode foil and the cathode foil; and
       a conductive polymer layer that is disposed on the first layer and includes a conductive polymer, wherein:
    the cathode foil has a roughened surface on which the first layer is formed, and
    the roughened surface of the cathode foil has a surface expansion rate ranging from 1.5 $cm^2/cm^2$ to 500 $cm^2/cm^2$, inclusive.

11. The electrolytic capacitor according to claim 10, wherein the roughened surface of the cathode foil is provided by etching.

12. The electrolytic capacitor according to claim 10, wherein the electrolyte solution contains a first solvent having no boiling point or a boiling point of 180° C. or more.

13. The electrolytic capacitor according to claim 12, wherein the first solvent contains a polyol.

14. The electrolytic capacitor according to claim 12, wherein a proportion of the first solvent contained in the electrolyte solution is ranging from 3% by mass to 90% by mass, inclusive.

15. The electrolytic capacitor according to claim 10, wherein the conductive polymer layer is formed with use of a dispersion containing the conductive polymer or a solution containing the conductive polymer.

* * * * *